(No Model.)
O. KUTSCHE.
PROCESS OF AND APPARATUS FOR SEPARATING DUST FROM AIR.
No. 458,550. Patented Aug. 25, 1891.
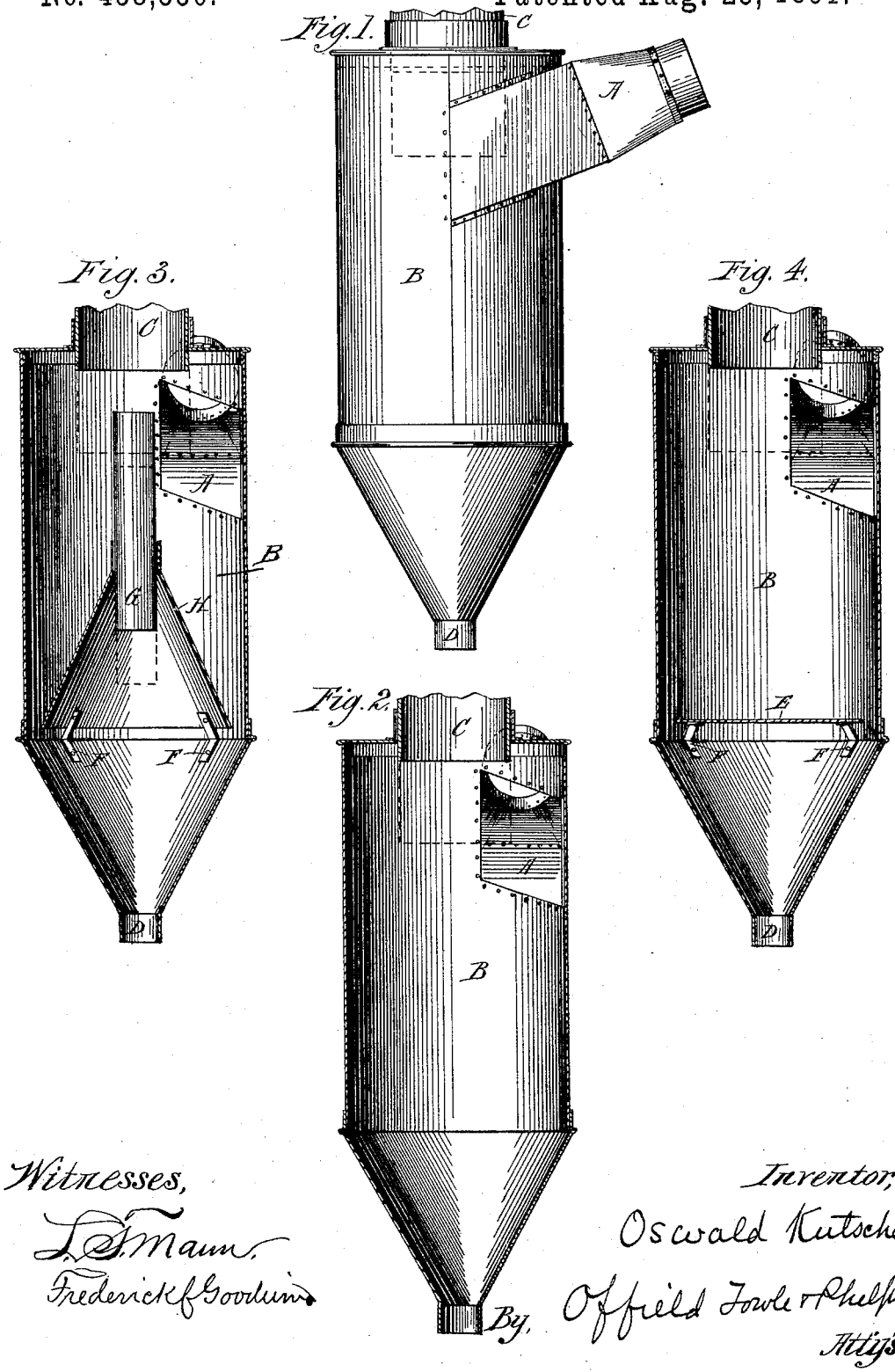

United States Patent Office.

OSWALD KUTSCHE, OF CHICAGO, ILLINOIS, ASSIGNOR, BY MESNE ASSIGNMENTS, TO THE ALLINGTON & CURTIS MANUFACTURING COMPANY, OF MICHIGAN.

PROCESS OF AND APPARATUS FOR SEPARATING DUST FROM AIR.

SPECIFICATION forming part of Letters Patent No. 458,550, dated August 25, 1891.

Application filed October 11, 1886. Serial No. 215,947. (No model.)

*To all whom it may concern:*

Be it known that I, OSWALD KUTSCHE, a citizen of the United States, residing at Chicago, in the county of Cook and State of Illinois, have invented a certain new and useful Improved Process of and Apparatus for Separating Dust from Air, which I desire to protect by Letters Patent of the United States, of which the following is a specification.

My invention relates to the art of separating dust from air in flour and other mills, factories, &c., and has for its object the accomplishment of such separation in a simpler, more practical, and inexpensive manner than has heretofore been possible. Screens have been extensively used for this purpose; but separators or collectors built on this principle are necessarily bulky and do not free the air from dust as thoroughly as is desirable.

It is the object of my present invention to devise an apparatus which should dispense with screens and perform their function in a more effectual manner than has heretofore been possible; and to that end my invention consists in the method and apparatus hereinafter described.

In the drawings annexed, which form a part of this specification, Figure 1 is a perspective, and Fig. 2 a vertical longitudinal section, of my apparatus; and Figs. 3 and 4, sections showing modifications.

The dust-laden air is introduced through an inlet-pipe A to a separating-chamber B, provided with a discharge pipe or orifice C for purified air and a second orifice D for dust or other waste, the walls of the chamber converging toward the second orifice. The junction of the inlet-pipe with the chamber is such that the air coming through the pipe has a tangential motion with reference to the chamber. The inlet-pipe is also inclined to the longitudinal axis of the chamber as it enters, and this is for the purpose of giving the air, and more particularly the waste which it contains, a centrifugal impulse toward the orifice D. As the air is forced into the chamber, the circular walls thereof give it a rotary motion and the dust or other waste is thrown, by reason of its greater relative specific gravity as compared with the air, against the inner surface of the cylinder, all the waste and dust being thus collected into a compact mass. Its momentum being downward as well as around the chamber of the cylinder, it follows a spiral course until it reaches the bottom and passes out through the orifice D, the air freed from dust meanwhile rising and passing out through the outlet C. Another independent advantage of this inclined position of the inlet-pipe is that the air as it strikes the wall of the chamber is deflected away from rather than toward the outlet C. The outlet-pipe C is adjustably placed in the top of the chamber, so that it may be moved in and out, as shown by the dotted lines in the several figures of the drawings, to regulate the air-pressure in the chamber. There is to a certain extent a dead-air space in the bottom of the chamber above the orifice D, and the waste is projected by the centrifugal momentum out of the moving air-current into this dead-air space, and thence passes, partly by gravity, through the orifice D. I find that better results are obtained by placing a deflector or partition between the upper part of the chamber and the lower part, making, in fact, an artificial dead-air space, and this construction I have shown in Figs. 3 and 4. In Fig. 4 this deflector or partition is a flat plate E of a slightly less diameter than the chamber and attached by brackets F, the space between its edges and the walls of the chamber serving to permit the waste to pass down, while the purified air is deflected upward from its upper surface. A preferred form is shown in Fig. 3, in which the partition is made of the shape of a hollow truncated cone H, similarly attached to the chamber and having an orifice at its top. When thus constructed, there will be an opportunity for a part of the air which passes down below the deflector with the dust and other waste to return through the hollow cone. I find it convenient to place the sliding pipe or collar G in the aperture in the apex of this cone, by adjusting which up and down I can adapt the dust-collector to the pressure in the delivery-pipe, so as to obtain the best results for varying pressures. This adjustable pipe G may be used alone or with the adjustable outlet C, and together they furnish means for very perfectly adjusting the apparatus to the pressure in the delivery-pipe. The conical form of deflector is preferred, because it better serves to deflect the dust or other waste toward the walls of the chamber, and it also better deflects the air upwardly toward the outlet C. It is obviously impossible with this conical deflector for dust to adhere to or accumulate upon its upper surface, as might occur in using the form of deflector shown in Fig. 4. This conical deflector also serves to constrict or narrow the chamber wherein the separation of the dust is effected, and thereby confines or compresses the air above its upper surface, and this confined air seeking to escape is deflected upwardly or toward the outlet by the sloping sides of the deflector. Obviously the size of the deflector, as well as its position within the chamber, may be varied in accordance with the character of materials being operated upon.

Having thus described my invention, what I claim, and desire to protect by Letters Patent, is—

1. In a dust-collector, the combination of a separating-chamber provided with an inlet-pipe for dust-laden air, said inlet-pipe being so placed that the incoming air has a tangential motion with reference to the chamber, the said chamber being provided with an outlet for dust, toward which the walls of the chamber are made to converge, and with a second outlet for air freed from dust at an opposite part of the chamber from the dust-outlet, with a cone-shaped deflector placed between the mouth of the inlet-pipe and the dust-outlet, substantially as and for the purpose set forth.

2. The combination of separating-chamber B, inlet-pipe A, and deflector H, said separating-chamber being provided with outlet D for dust and waste and outlet C for purified air, and said deflector H being provided with adjustable pipe G, all substantially as and for the purpose set forth.

3. In a dust-collector, the combination of separating-chamber B, inlet-pipe A, and cone-shaped deflector H, said separating-chamber provided with dust-outlet D and adjustable air-outlet C, and said deflector H being provided with adjustable pipe G, substantially as and for the purpose set forth 4. A dust-collector consisting, essentially, of a casing having an air-inlet, a tubular guard inside said casing, and a conical deflector also inside said casing below said tubular guard and air-inlet, substantially as set forth.

5. A dust-collector comprising, in combination, a separating-chamber formed by a casing having a tangential inlet for the dust-laden air and separate outlets for the purified air and for the separated dust, and a conical deflector arranged within the chamber between the air-outlet and the dust-outlet, substantially as described.

OSWALD KUTSCHE.

Witnesses:
FREDERICK C. GOODWIN,
R. S. WEBSTER.